(12) United States Patent
Lyu et al.

(10) Patent No.: US 12,219,616 B1
(45) Date of Patent: Feb. 4, 2025

(54) METHOD AND DEVICE FOR USE IN NODES FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/920,026

(22) Filed: Oct. 18, 2024

Related U.S. Application Data

(63) Continuation of application No. PCT/CN2023/104459, filed on Jun. 30, 2023.

(51) Int. Cl.
H04W 74/0833 (2024.01)

(52) U.S. Cl.
CPC .................................. H04W 74/085 (2013.01)

(58) Field of Classification Search
CPC ........... H04W 74/085; H04W 74/0858; H04W 76/18
See application file for complete search history.

(56) References Cited

U.S. PATENT DOCUMENTS

| 8,493,994 B2 * | 7/2013 | Park | H04W 74/006 |
| | | | 370/448 |
| 10,257,863 B2 * | 4/2019 | Bergström | H04W 74/0833 |
| 10,542,563 B2 * | 1/2020 | Kato | H04W 74/0858 |
| 11,337,251 B2 * | 5/2022 | Takahashi | H04B 7/0617 |
| 11,363,636 B2 * | 6/2022 | Zhao | H04W 52/362 |
| 11,497,061 B2 * | 11/2022 | Lee | H04W 72/23 |

(Continued)

FOREIGN PATENT DOCUMENTS

| CN | 109845384 | 6/2019 |
| WO | WO 2022133357 | 6/2022 |

(Continued)

OTHER PUBLICATIONS

China Telecom, "Revised WID on Further NR coverage enhancements," 3GPP TSG RAN Meeting #96, RP-221858, Budapest, Hungary, Jun. 6-9, 2022, 5 pages.

(Continued)

*Primary Examiner* — Ahmed Elallam
(74) *Attorney, Agent, or Firm* — Fish & Richardson P.C.

(57) ABSTRACT

A method and device for use in nodes for wireless is provided. One example method includes: transmitting, by a first node, X1 first random access (RA) preambles, X1 being a positive integer greater than 1; monitoring a control signaling for a first random access response (RAR) during a first time-window, wherein the first RAR corresponds to the X1 first RA preambles; updating a current value of a first counter to obtain an updated value of the first counter when reception of the first RAR is not successful while the first time-window expires; and transmitting X2 second RA preambles in response to the updated value of the first counter being less than the first threshold, wherein X2 is a positive integer greater than or equal to X1; or dropping transmission of X2 second RA preambles in response to the updated value of the first counter being greater than the first threshold.

11 Claims, 4 Drawing Sheets

(56) References Cited

U.S. PATENT DOCUMENTS

| | | | |
|---|---|---|---|
| 12,052,760 B2* | 7/2024 | Jeon | H04W 74/0833 |
| 12,137,483 B2* | 11/2024 | Qiu | H04W 74/0866 |
| 2020/0100295 A1* | 3/2020 | Pao | H04L 5/0082 |
| 2020/0146070 A1* | 5/2020 | Xiong | H04W 56/001 |
| 2020/0229241 A1 | 7/2020 | Jeon et al. | |
| 2021/0076416 A1 | 3/2021 | Shah et al. | |
| 2021/0136606 A1* | 5/2021 | Jia | H04W 56/00 |
| 2023/0284279 A1* | 9/2023 | Zhou | H04W 72/04 |
| | | | 370/328 |
| 2024/0298355 A1* | 9/2024 | Dinan | H04W 74/0833 |

FOREIGN PATENT DOCUMENTS

| | | |
|---|---|---|
| WO | WO 2023059094 | 4/2023 |
| WO | WO-2024045176 A1 * | 3/2024 |

OTHER PUBLICATIONS

International Search Report and Written Opinion in International Appln. No. PCT/CN2023/104459, mailed on Dec. 21, 2023, 12 pages (with English translation).
Office Action in Chinese Appln. No. 202380010747.2, mailed on Jun. 20, 2024, 14 pages (with English translation).
Samsung, "Further Discussion on NR Random Access and Impact on RAN4 RRM Specification," 3GPP TSG-RAN WG4 Meeting #86, R4-1802037, Athens, Greece, Feb. 26-Mar. 2, 2018, 6 pages.

* cited by examiner

METHOD AND DEVICE FOR USE IN NODES FOR WIRELESS COMMUNICATION

CROSS-REFERENCE TO RELATED APPLICATIONS

This application is a continuation of International Application No. PCT/CN2023/104459, filed on Jun. 30, 2023, the disclosure of which is hereby incorporated by reference in its entirety.

TECHNICAL FIELD

The various embodiments described in this document relate in general to the technical field of communications and more particularly to a method and device for use in nodes for wireless communication.

BACKGROUND

In order to enhance the coverage performance of random access, some communication systems (e.g., new radio (NR) systems) plan to introduce retransmissions based on multiple physical random access channel (PRACH) transmissions, and to increase the number of PRACH transmissions in the retransmissions. However, increasing the number of PRACH transmissions of the multiple PRACH transmissions in the retransmissions may consume additional time-frequency resources, and may also increase collision probability of PRACH preambles. In this case, how to allocate resources for multiple PRACH retransmissions, and how to balance the resource consumption of the multiple PRACH retransmissions and the effectiveness of random access have become problems to be solved.

SUMMARY

Embodiments of the present disclosure provide a method and device for use in nodes for wireless communication. Various aspects of the present disclosure are described below.

According to a first aspect, embodiments of the disclosure provide a method for use in a first node for wireless communication, including: transmitting X1 first random access (RA) preambles, X1 being a positive integer greater than 1; monitoring a control signaling for a first random access response (RAR) during a first time-window, where the first RAR corresponds to the X1 first RA preambles; and increasing a current value of a first counter by X2 to obtain an updated value of the first counter in response to expiration of the first time-window and the first RAR being unsuccessfully received, where X2 is a positive integer greater than or equal to X1. A magnitude relationship between the updated value of the first counter and a first threshold is configured to determine whether to transmit X2 second RA preambles, the first threshold being configured by higher layer signaling.

As an implementation, the X2 second RA preambles are transmitted in response to the updated value of the first counter being less than the first threshold, and transmission of the X2 second RA preambles are dropped in response to the updated value of the first counter being greater than the first threshold.

As an implementation, a current value of a second counter is increased by 1 to obtain an updated value of the second counter, where a magnitude relationship between the updated value of the second counter and a sum of a second threshold plus 1 is configured to determine whether to transmit the X2 second RA preambles, or whether the updated value of the second counter is equal to the sum of the second threshold plus 1 is configured to determine whether to transmit the X2 second RA preambles, the second threshold being configured by higher layer signaling.

As an implementation, an initial value of the second counter is set to 1, where the initial value of the second counter is less than or equal to the current value of the second counter.

As an implementation, transmit the X2 second RA preambles in response to the updated value of the first counter being less than the first threshold and the updated value of the second counter being not equal to the sum of the second threshold plus 1. Transmission of the X2 second RA preambles are dropped in response to the updated value of the first counter being greater than the first threshold or the updated value of the second counter being equal to the sum of the second threshold plus 1.

As an implementation, a RA problem is indicated to upper layers in response to the updated value of the second counter being equal to the sum of the second threshold plus 1. As an implementation, an initial value of the first counter is set to X0, where X0 is a positive integer greater than 1, and the initial value of the first counter is less than or equal to the current value of the first counter. X0 physical random access channel (PRACH) occasions (ROs) are selected. The X0 ROs are configured for a first RA procedure.

As an implementation, a RA problem is indicated to upper layers in response to the updated value of the first counter being greater than the first threshold.

As an implementation, the first time-window is stopped in response to the first RAR being successfully received during the first time-window.

As an implementation, first information is received, where the first information is configured to determine a plurality of candidate values, the plurality of candidate values including X1 and X2.

According to a second aspect, a method for use in a second node for wireless communication is provided. The method includes: performing reception of X1 first random access (RA) preambles, X1 being a positive integer greater than 1; and determining whether to transmit a control signaling for a first random access response (RAR) according to a result of the reception of the X1 first RA preambles during a first time-window, where the first RAR corresponds to the X1 first RA preambles. The first time-window expires, the control signaling for the first RAR is not successfully transmitted, and a magnitude relationship between an updated value of a first counter of a first node transmitting the X1 first RA preambles and a first threshold is configured to determine whether to perform reception of X2 second RA preambles, X2 being a positive integer greater than or equal to X1, and the first threshold being configured by higher layer signaling.

As an implementation, reception of the X2 second RA preambles is performed in response to the updated value of the first counter being less than the first threshold. The reception of the X2 second RA preambles is dropped in response to the updated value of the first counter being greater than the first threshold.

As an implementation, a magnitude relationship between an updated value of a second counter of the first node and a sum of a second threshold plus 1 is configured to determine whether to perform the reception of the X2 second RA preambles, or whether the updated value of the second counter of the first node is equal to a sum of the second threshold plus 1 is configured to determine whether to perform the reception of the X2 second RA preambles, the second threshold being configured by higher layer signaling.

As an implementation, the reception of the X2 second RA preambles is performed in response to the updated value of the first counter being less than the first threshold and the updated value of the second counter is not equal to the sum of the second threshold plus 1. The reception of the X2 second RA preambles is dropped in response to the updated value of the first counter is greater than the first threshold or the updated value of the second counter is equal to the sum of the second threshold plus 1.

As an implementation, the first time-window is stopped, in response to the control signaling for the first RAR is transmitted successfully during the first time-window.

As an implementation, first information is transmitted, the first information being configured to determine a plurality of candidate values, the plurality of candidate values including X1 and X2.

According to a third aspect, a first node for wireless communication is provided. The first node includes: a first transmitter configured to transmit X1 first random access (RA) preambles, X1 being a positive integer greater than 1; a first receiver configured to monitor a control signaling for a first random access response (RAR) during a first time-window, the first RAR corresponding to the X1 first RA preambles; and a first counter configured to increase a current value of the first counter by X2 to obtain an updated value of the first counter in response to expiration of the first time-window and the first RAR being unsuccessfully received, where X2 is a positive integer greater than or equal to X1. A magnitude relationship between the updated value of the first counter and a first threshold is configured to determine whether to transmit X2 second RA preambles, the first threshold being configured by higher layer signaling.

As an implementation, the first transmitter is further configured to: transmit the X2 second RA preambles in response to the updated value of the first counter being less than the first threshold; and drop transmission of the X2 second RA preambles in response to the updated value of the first counter being greater than the first threshold.

As an implementation, the first node further includes: a second counter configured to increase a current value of the second counter by 1 to obtain an updated value of the second counter, where a magnitude relationship between the updated value of the second counter and a sum of a second threshold plus 1 is configured to determine whether to transmit the X2 second RA preambles, or whether the updated value of the second counter is equal to the sum of the second threshold plus 1 is configured to determine whether to transmit the X2 second RA preambles, the second threshold being configured by higher layer signaling.

As an implementation, the second counter is further configured to set an initial value of the second counter to 1, where the initial value of the second counter is less than or equal to the current value of the second counter.

As an implementation, the first transmitter is further configured to: transmit the X2 second RA preambles in response to the updated value of the first counter being less than the first threshold and the updated value of the second counter being not equal to the sum of the second threshold plus 1; and drop transmission of the X2 second RA preambles in response to the updated value of the first counter being greater than the first threshold or the updated value of the second counter being equal to the sum of the second threshold plus 1.

As an implementation, the first node further includes: a first processor configured to indicate a RA problem to upper layers in response to the updated value of the second counter being equal to the sum of the second threshold plus 1.

As an implementation, the first counter is further configured to set an initial value of the first counter to X0, where X0 is a positive integer greater than 1, and the initial value of the first counter is less than or equal to the current value of the first counter. The first node further includes a second processor configured to select X0 physical random access channel (PRACH) occasions (ROs). The X0 ROs are configured for a first RA procedure.

As an implementation, the first node further includes: a third processor configured to indicate a RA problem to upper layers in response to the updated value of the first counter being greater than the first threshold.

As an implementation, the first node further includes: a fourth processor configured to stop the first time-window in response to the first RAR being successfully received during the first time-window.

As an implementation, the first receiver is further configured to receive first information, where the first information is configured to determine a plurality of candidate values, the plurality of candidate values including X1 and X2.

According to a fourth aspect, a second node for wireless communication is provided. The second node includes: a second receiver configured to perform reception of X1 first random access (RA) preambles, X1 being a positive integer greater than 1; and a fifth processor configured to determine whether to transmit a control signaling for a first random access response (RAR) according to a result of the reception of the X1 first RA preambles during a first time-window, where the first RAR corresponds to the X1 first RA preambles. The first time-window expires, the control signaling for the first RAR is not successfully transmitted, a magnitude relationship between an updated value of a first counter of a first node transmitting the X1 first RA preambles and a first threshold is configured to determine whether to perform reception of X2 second RA preambles, X2 being a positive integer greater than or equal to X1, and the first threshold being configured by higher layer signaling.

As an implementation, the second receiver is further configured to: perform the reception of the X2 second RA preambles in response to the updated value of the first counter being less than the first threshold; and drop the reception of the X2 second RA preambles in response to the updated value of the first counter being greater than the first threshold.

As an implementation, a magnitude relationship between an updated value of a second counter of the first node and a sum of a second threshold plus 1 is configured to determine whether to perform the reception of the X2 second RA preambles, or whether the updated value of the second counter of the first node is equal to the sum of the second threshold plus 1 is configured to determine whether to perform the reception of the X2 second RA preambles, the second threshold being configured by higher layer signaling.

As an implementation, the second receiver is further configured to: perform the reception of the X2 second RA preambles in response to the updated value of the first counter being less than the first threshold and the updated value of the second counter being not equal to the sum of the second threshold plus 1; and drop the reception of the X2 second RA preambles in response to the updated value of the first counter being greater than the first threshold or the updated value of the second counter being equal to the sum of the second threshold plus 1.

As an implementation, the fifth processor is further configured to stop the first time-window, in response to the control signaling for the first RAR being transmitted successfully during the first time-window.

As an implementation, the second node further includes: a second transmitter configured to transmit first information, the first information being configured to determine a plurality of candidate values, the plurality of candidate values including X1 and X2.

According to a fifth aspect, a first node for wireless communication is provided and includes a transceiver, a memory for storing programs, and a processor, where the processor is configured to invoke the programs in the memory to control the transceiver to receive or transmit signals to cause the first node to perform the method as described in the first aspect.

According to a sixth aspect, a second node for wireless communication is provided and includes a transceiver, a memory for storing programs, and a processor, where the processor is configured to invoke the programs in the memory to control the transceiver to receive or transmit signals to cause the second node to perform the method as described in the second aspect.

According to a seventh aspect, a communication system is provided. The communication system includes the first node and/or the second node as described above. In another possible design, the system may further include other devices that interact with the first node or second node in the solutions provided by embodiments of the present disclosure.

According to an eight aspect, a computer-readable storage medium is provided and stores a computer program, the computer program causing a computer to perform all or some operations of the method of any aspect described above.

According to a ninth aspect, a computer program product is provided. The computer program product includes a non-transitory computer-readable storage medium storing a computer program, the computer program being operable to cause a computer to perform some or all of the operations in the method of the various aspects described above. In some implementations, the computer program product may be a software installation package.

According to a tenth aspect, a chip is provided and includes a memory and a processor, the processor being capable of invoking and running a computer program stored in the memory to carry out some or all of the operations described in the methods of the above aspects.

In the embodiments of the present disclosure, when the first RAR corresponding to the X1 first RA preambles is not successfully received, the first node can determine whether to transmit X2 second RA preambles according to the magnitude relationship between the updated value of the first counter and the first threshold, and the updated value of the first counter is related to X2. By setting the first threshold, the first node can limit the total transmission number of the RA preambles, which is helpful to reduce the resource consumption of multiple PRACH retransmissions.

In the embodiments of the present disclosure, when the first RAR is not received successfully, the first node can determine whether to continue to transmit the RA preambles according to the first threshold and the updated value of the first counter, so as to balance the resource consumption of PRACH and the validity of RA.

In the embodiments of the disclosure, the first node supports the retransmissions based on the multiple PRACH transmissions, and determines the number of retransmissions based on the multiple PRACH transmissions according to the first threshold and the updated value of the first counter, which is not only helpful to improve the performance gain of the multiple PRACH transmissions and increase the coverage range, but also helpful to reducing the RA delay and improve the utilization efficiency of the RA resources.

DETAILED DESCRIPTION OF THE EMBODIMENTS

Communication System Architecture

Figure 1:
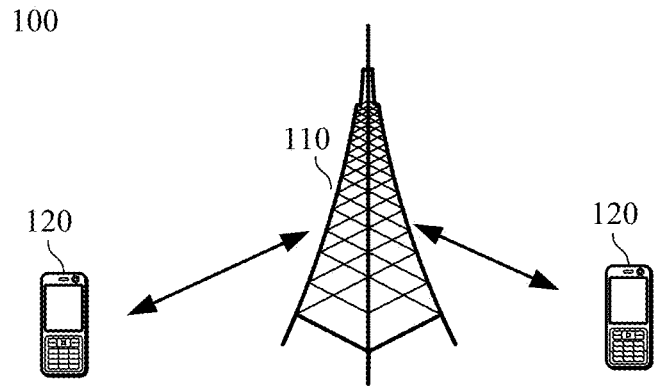
FIG. 1 is an example diagram of a system architecture of a wireless communication system to which an embodiment of the present disclosure can be applied.

FIG. 1 is an example diagram of a system architecture of a wireless communication system 100 to which an embodiment of the present disclosure may be applied. The wireless communication system 100 may include a network device 110 and at least one user equipment (UE) 120. The network device 110 may communicate with each UE 120. The network device 110 may provide communication coverage for a particular geographic region and may communicate with the at least one UE 120 located within the coverage region.

FIG. 1 exemplarily illustrates one network device and two UEs. Alternatively, the wireless communication system 100 may include a plurality of network devices and other numbers of UEs may be included within a coverage range of each network device, which is not limited in embodiments of the present disclosure.

Alternatively, the wireless communication system 100 may further include other network entities such as network controllers, mobility management entities, and the like which are not limited in embodiments of the present disclosure.

It shall be understood that technical proposal of the embodiments of the present disclosure may be applied to initial access or may be applied to beam failure recovery. Further, the technical proposal of the embodiments of the present disclosure may be applied to Type-1 random access procedure, or can also be applied to Type-2 random access procedure. Further, the technical proposal of the embodiments of the present disclosure can be applied to Uu interface, or can also be applied to the PC5 interface. Further, the technical proposal of the embodiments of the present disclosure can be applied to single carrier communication, or can also be applied to multi-carrier communication. Further, the technical proposal of the embodiments of the present disclosure can be applied to multi-antenna communication, or can also be applied to single-antenna communication. Further, the technical proposal of the embodiments of the present disclosure can be applied in a scenario involving UEs and a base station, or can be applied in a V2X scenario, the communication scenario involving UEs and relays, or the communication scenario involving the relays and the base stations, so as to obtain similar technical effects in the scenario involving the UEs and the base station. Further, the technical proposal of the embodiments of the present disclosure can be applied to various communication scenarios, such as enhanced mobile broadband (eMBB) scenarios, ultra-reliable low-latency communication (URLLC) scenarios, massive machine type communication (mMTC) scenarios, and the like. In addition, adopting a unified solution for different scenarios also helps to reduce hardware complexity and cost.

It shall be understood that the embodiments and features in the embodiments of the first node of the present disclosure may be applied to the second node and vice versa without conflict. Embodiments of the present disclosure and features in the embodiments may be arbitrarily combined with each other without conflict.

It shall be understood that the technical solutions of the embodiments of the present disclosure may be applied to various communication systems, such as: $5^{th}$ generation (5G) mobile communication systems or new radio (NR), long term evolution (LTE) systems, LTE frequency division duplex (FDD) systems, LTE time division duplex (TDD), and the like. The technical proposal provided by the present disclosure can also be applied to future communication systems, such as sixth generation mobile communication systems, satellite communication systems, etc.

The UE in embodiments of the present disclosure may also be referred to as a terminal device, an access terminal, a subscriber unit, a subscriber station, a mobile station, a mobile station (MS), a mobile terminal (MT), a remote station, a remote terminal, a mobile device, a user terminal, a terminal, a wireless communication device, a user agent, or a user device. The UE in the embodiments of the present disclosure may be a device providing voice and/or data connectivity to a user, and may be used for connecting people, objects, and machines, such as handheld devices with wireless connection function, vehicle-mounted devices, etc. The UE in the embodiments of the present disclosure may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, and a wireless terminal in a smart city, a wireless terminal in smart home, etc. Alternatively, the UE may be used to act as a base station. For example, the UE may act as a scheduling entity that provides side link signals between UEs in V2X or D2D or the like. For example, cellular phones and cars communicate with each other using side link signals. Cellular phones communicate with smart homes devices without relaying communication signals through base stations.

The network device in embodiments of the present disclosure may be a device for communicating with the UE, and the network device may also be referred to as an access network device or a radio access network device. For example, the network device may be a base station. The network device in the embodiments of the present disclosure may refer to a radio access network (RAN) node (or device) that accesses a UE to a wireless network. The base station can broadly cover or replace with the following names, such as Node B (NodeB), evolved NodeB (eNB), next generation NodeB (gNB), relay station, access point, transmitting and receiving point (TRP), transmitting point (TP), master eNodeB (MeNB), secondary eNodeB (SeNB), multi-standard radio (MSR) node, home base station, network controller, access node, wireless node, access point (AP), transmission node, transceiver node, base band unit (BBU), remote radio unit (RRU), an active antenna unit (AAU), a remote radio head (RRH), a central unit (CU), a distributed unit (DU), a positioning node, and the like. The base station may be a macro base station, a micro base station, a relay node, a donor node or the like, or a combination thereof. The base station may also refer to a communication module, a modem, or a chip provided in the device or device. The base station may also be a mobile switching center and a device that undertakes a base station function in device-to-device (D2D), vehicle-to-everything (V2X), machine-to-machine (M2M) communication, a network-side device in a 6G network, a device that undertakes a base station function in a future communication system, and the like. Base stations can support networks with the same or different access technologies. There is no restriction on the specific technology and the specific equipment adopted by the network in the embodiments of the present disclosure.

The base station can be fixed or mobile. For example, a helicopter or unmanned aerial vehicle may be configured to act as a mobile base station and one or more cells may change depending on the location of the mobile base station. In other examples, the helicopter or unmanned aerial vehicle may be configured to serve as a device for communicating with another base station.

In some deployments, the network device in the embodiments of the present disclosure may refer to a CU or a DU or the network device includes a CU and a DU. The gNB may further include AAU.

The network device and the UE can be deployed on land, including indoor or outdoor, hand-held, or vehicle-mounted device, or can also be deployed on the water surface. Alternatively, the network device and the UE can also be deployed on airplanes, balloons, and satellites in the air. In the embodiments of the present disclosure, the scene in which the network device and the UE are located is not limited.

It shall be understood that all or part of the functionality of the communication device in the present disclosure may also be implemented by software functionality running on hardware or by virtualization functionality instantiated on a platform (e.g. a cloud platform).

It shall be understood that the terminology in embodiments of the present disclosure may be interpreted with reference to the 3GPP specification protocols TS36 series, TS37 series, and TS38 series, and can also be interpreted with reference to the specification protocols of the institute of electrical and electronics engineers (IEEE).

Coverage Enhancement of PRACH Transmission

Coverage performance of communication systems (for example, NR system) is an important factor that operators need to consider when they deploy commercial communication networks, because the coverage performance of the communication systems may directly affect the service quality of the communication system and the cost of operators, such as capital expenditure (CAPEX) and operating expense (OPEX) of the operators.

The coverage performance of the communication systems may change with different operating frequency bands of the communication systems. For example, compared to LTE systems, NR systems operate in higher frequency bands (e.g., millimeter-wave bands), resulting in greater path loss in the NR systems, which leads to relatively poorer coverage performance in the NR systems. Therefore, as the frequency bands supported by the communication systems may be more and more high, how to enhance the coverage of the communication systems has become a problem to be solved.

In most scenarios of actual deployment, because the capability of the UE is weaker than that of the network device, the coverage performance of uplink (UL) is the bottleneck of coverage enhancement of the communication system. With the development of communication technologies, uplink services in some emerging vertical use cases are gradually increasing, for example, video uploading services. In the scenario of more uplink services, how to enhance uplink coverage is a problem that needs to be further solved.

In related technologies, there are technical schemes for coverage enhancement for some uplinks. For example, in release 17 (Rel-17) of the NR, coverage enhancement schemes for physical uplink shared channel (PUSCH), physical uplink control channel (PUCCH), and message 3 (Msg3) in a random access procedure has been designed.

However, in the Rel-17, there is no design scheme for coverage enhancement of the PRACH, but the transmission performance of the PRACH is very important for many processes such as initial access and beam failure recovery, so it is also relatively important to enhance the coverage of the PRACH. Based on this, the 3rd generation partnership project (3GPP) formally established the work item (WI) for "further NR coverage enhancements" in Rel-18 of the NR through project RP-221858, in which enhancing the coverage performance of the PRACH transmission is one of important topics of the work item.

As a possible implementation, multiple PRACH transmissions can be used to realize the coverage enhancement of the PRACH transmissions. That is, the performance gain of PRACH transmissions can be obtained by repeated transmissions on the PRACH (for example, sending preambles on the PRACH many times).

In order to achieve the coverage enhancement of PRACH transmissions, 3GPP radio access network (RAN) 1 #110bis-e conference agreed to use multiple PRACH transmissions of a same beam in one RACH attempt to obtain the performance gain. The RAN1 #110bis-e conference further supports the use of a same PRACH preamble in the multiple PRACH transmissions, and PRACH occasions (ROs) at different time instances can be configured for the multiple PRACH transmissions.

Further, the 3GPP RAN1 #112 conference agreed to introduce a PRACH occasion group (RO group, ROG) for the multiple PRACH transmissions. In addition, all ROs in one ROG are associated with a same synchronization signal/physical broadcast channel block(s) (SS/PBCH block(s), SSB(s)). The number of PRACH transmissions in the multiple PRACH transmissions using the same beam is 2, 4, or 8, i.e., the multiple PRACH transmissions using the same beam support 2 PRACH transmissions, 4 PRACH transmissions, or 8 PRACH transmissions.

Further, the 3GPP RAN1 #112bis-e conference agreed that multiple PRACH transmissions in one RACH attempt run only in an ROG, the number of PRACH transmissions in the multiple PRACH transmissions is configured as one value or more values, and the number of valid ROs in an ROG is equal to the one value or one of the more values. That is, a size (ROG size) of the ROG is one of two ROs, four ROs, or eight ROs, depending on one or more values configured for the number of PRACH transmissions in the multiple PRACH transmissions.

Based on the above technical progress, follow-up conferences discussed the scheme of retransmission based on multiple PRACH transmissions and increasing the number of PRACH transmissions in retransmissions. For example, the 3GPP RAN1 #113 conference discussed a scheme of performing a single PRACH transmission or multiple PRACH transmissions in an initial RACH attempt, and allowing an increase in the number of PRACH transmissions in retransmissions. In this way, it is possible to allow that the UE in limited coverage scenarios can quickly access the system by adjusting the number of PRACH transmissions of multiple PRACH transmissions in retransmissions when the number of PRACH transmissions determined in the initial RACH attempt is not able to meet the performance requirements. Especially when a PRACH transmission power of the UE reaches a maximum transmission power and there is no extra power for increasing the coverage, increasing the number of PRACH transmissions in the multiple PRACH transmissions to obtain the merging gain is an effective solution. For another example, the 3GPP RAN2 #122 conference also agreed to further discuss a fallback mechanism from the smaller number of PRACH transmissions to the larger number of PRACH transmissions in the multiple PRACH transmissions.

However, increasing the number of the PRACH transmissions of the multiple PRACH transmissions in the retransmission may consume extra time-frequency resources and increase the collision probability of PRACH preambles. When the number of the PRACH transmissions of the multiple PRACH transmissions performed by the UE in a previous RACH attempt is already relatively large, increasing the number of the PRACH transmissions of the multiple PRACH transmissions in multiple retransmissions may cause a large amount of resource consumption and increase the collision probability of the preambles. Especially, if access failure of the UE is caused by preamble collision, increasing the number of PRACH transmissions at the cost of consuming resources is an inefficient and resource-wasting solution. In this case, a good solution is to re-initiate another random access procedure, and re-select random access resources and PRACH preambles.

Therefore, in the scenario of performing multiple PRACH retransmissions, how to allocate the resources of multiple PRACH retransmissions and how to balance the resource consumption of the multiple PRACH retransmissions and the effectiveness of random access are problems that need to be solved.

In order to solve the above problems, the embodiments of the disclosure provide a method and a device for use in nodes for wireless communication, which can reduce the resource consumption of the multiple PRACH retransmissions, balance the resource consumption of the multiple PRACH retransmissions and the effectiveness of random access, and contribute to reduce a random access delay and improve the utilization efficiency of the random access resources while improving the performance gain of the multiple PRACH transmissions and increasing the coverage range.

Embodiments of the present disclosure can be applied to a retransmission scenario based on the multiple PRACH transmissions, that is, repeated transmissions of multiple PRACHs (multiple PRACH retransmissions) can be adopted in multiple RACH attempts to realize coverage enhancement of the PRACH.

In some embodiments, the multiple PRACH transmissions referred to in embodiments of the present disclosure may refer to multiple PRACH transmissions using the same beam, to obtain a signal-to-noise ratio gain by performing repeated transmissions of multiple PRACHs on the same beam. In some embodiments, the multiple PRACH transmissions referred to in embodiments of the present disclosure may refer to multi-PRACH transmissions using different beams, to obtain diversity gain by performing repeated transmissions of multiple PRACHs on the different beams.

It shall be noted that the beam mentioned in the embodiments of the present disclosure can be replaced by other terms, such as an antenna port, a spatial filter, a spatial parameter, etc., which may have identical meanings, and the embodiments of the present disclosure do not distinguish between them.

Embodiments of the present disclosure can be applied to an initial access procedure or a beam failure recovery procedure. Taking the initial access procedure as an example, the embodiments of the present disclosure may be applied to a four-step random access procedure (i.e., Type-1 random access procedure) or may also be applied to a two-step random access procedure (i.e., Type-2 random access procedure), which is not limited in the embodiments of the present disclosure.

Figure 2:
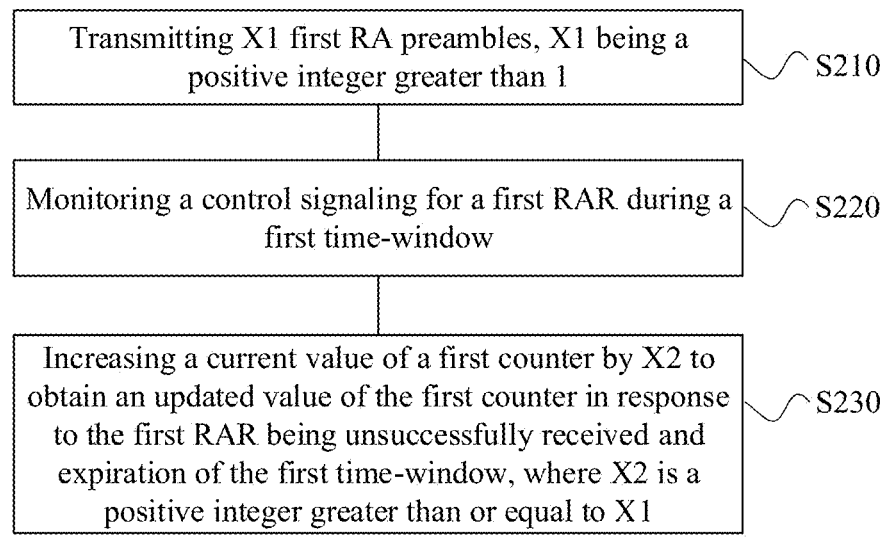
FIG. 2 is a flow chart of a method for use in a first node of wireless communication according to an embodiment of the present disclosure.

Embodiments of the method of the present disclosure are described in detail below with reference to the accompanying drawings. FIG. 2 is a flow chart of a method for use in a first node of wireless communication according to an embodiment of the present disclosure. The method is used for interaction between the first node and a second node.

As an embodiment, the first node may be a network-controlled repeater (NCR).

As an embodiment, the first node may be a UE, such as, the UE 120 shown in FIG. 1.

As an embodiment, the first node may be a relay, such as a relay terminal.

As an embodiment, the second node may be a network device, such as, the network device 110 shown in FIG. 1

The method shown in FIG. 2 includes operations at S210, S220, and S230, which are described below.

At S210, the first node transmits X1 first random access (RA) preambles, where X1 is a positive integer greater than 1.

The random access preamble (RA preamble) can be replaced by the PRACH preamble described above. The first RA preamble refers to a RA preamble generated by the first node through a RA sequence.

In some embodiments, the first RA preamble is a RA preamble sent by the first node in a current RA process (also referred to as a RA procedure). The current RA procedure may be referred to as a first RA procedure. The first RA procedure may include multiple random access channel attempts (RACH attempts) by the first node. The first RA preamble is a preamble transmitted in a current RACH attempt.

As an embodiment, the first RA procedure includes transmitting the X1 RA preambles.

As an embodiment, a RACH attempt currently made by the first node includes transmitting the X1 first RA preambles. The RACH attempt currently made may be any one of the multiple RACH attempts in the first RA procedure. For example, the X1 RA preambles currently transmitted by the first node may be X1 RA preambles transmitted for the first time or for the N-th time (N>1).

In some embodiments, the number of RA preambles transmitted by the first node is related to the number of PRACH transmissions of the multiple PRACH transmissions. For example, the X1 first RA preambles may indicate that the number of PRACH transmissions of the multiple PRACH transmissions currently performed by the first node is X1.

In some embodiments, the number of RA preambles transmitted by the first node is related to the number of ROs in a ROG occupied by the multiple PRACH transmissions. For example, the X1 first RA preambles may indicate that the number of ROs in the ROG occupied by the multiple PRACH transmissions currently performed by the first node is X1.

As an embodiment, the first node may transmit same or different numbers of RA preambles in the multiple RACH attempts. For example, the first node transmits X1 RA preambles in the current RACH attempt, and the number of RA preambles to be transmitted by the first node in a next RACH attempt is different from X1.

In some embodiments, the first node may determine X1 by receiving first information. Exemplarily, the first information is configured to determine a plurality of candidate values, the plurality of candidate values including X1.

As an embodiment, the plurality of candidate values for X1 include at least one of {2, 4, 8}.

For the second node, the second node may perform reception of the X1 first RA preambles. In some embodiments, the second node may receive one or more of the X1 first RA preambles. In some embodiments, the second node may receive no first RA preamble.

At S220, a control signaling for a first RAR is monitored during a first time-window.

The first time-window may be a time-window in which the first node monitors a random access response (RAR) for the X1 RA preambles.

As an embodiment, a media access control (MAC) entity may initiate/start a first time-window at a first physical downlink control channel (PDCCH) occasion after transmission of the first RA preambles ends.

The control signaling for the first RAR may be carried by a PDCCH associated with the first RAR.

As an embodiment, for the initial access procedure, the first node monitoring the control signaling for the first RAR includes monitoring the PDCCH for the RAR during running of the first time-window.

As an embodiment, for the beam failure recovery procedure, the first node monitoring the control signaling for the first RAR includes monitoring PDCCH transmissions on a search space indicated by recoverySearchSpaceId during running of the first time-window.

As an embodiment, the first RA procedure includes monitoring the control signaling for the first RAR during the first time-window.

As an embodiment, the first RA procedure includes receiving the first RAR.

As an embodiment, the first RA procedure includes transmission of a first physical uplink shared channel (PUSCH), the first PUSCH being scheduled by an uplink grant (UL grant) in the first RAR.

As an embodiment, the first RA procedure includes reception of the first physical downlink shared channel (PDSCH), the first PDSCH being configured for collision resolution.

The first RAR corresponds to the X1 first RA preambles. That is, the first RAR is a RAR sent by the second node for one or more of the X1 first RA preambles. The second node may determine, within the first time-window, whether to transmit the control signaling for the first RAR according to a reception result of the X1 first RA preambles.

In some embodiments, the reception result of the first RA preambles may include the number of at least one first RA preamble, of the X1 first RA preambles, that has been received, or may also include whether there is RA preamble of the X1 first RA preambles collides with other RA preambles, which is not limited herein.

As an embodiment, the second node may transmit, within the first time-window, the first RAR when at least one first RA preamble received by the second node satisfies a condition for transmitting the RAR. On the contrary, if no first RA preamble is received by the second node, or if the received at least one first RA preamble does not satisfy the condition for transmitting the RAR, the second node does not transmit the first RAR.

At S230, if the first time-window expires, and no first RAR is received (reception of the first RAR is not successful), a current value of a first counter is increased by X2 to obtain an updated value of the first counter, X2 being a positive integer greater than or equal to X1.

The reception of the first RAR being not successful means that when the first time-window expires, the first node does not receive the first RAR corresponding to the X1 first RA preambles, or the first node fails to receive the first RAR.

As an embodiment, when the first time-window expires, if the first node receives no PDCCH transmission on the search space indicated by recoverySearchSpaceId in a serving cell where the first node transmitted the first RA preambles, it indicates that the first node fails to receive the first RAR.

As an embodiment, when the first time-window expires, if the first node does not receive the RAR or an identity of a RA preamble contained in a received RAR does not match a transmitted preamble index, it indicates that the first RAR is not successfully received.

The first counter is configured for the first node to count the number of PRACH transmissions of all multiple PRACH transmissions in multiple RACH attempts, or to count the number of ROs occupied by all the multiple PRACH transmissions, or to count the number of RA preambles transmitted.

In some embodiments, the first counter may be a conventional preamble transmission counter of the first node or a newly set PRACH transmission counter of the first node, which is not limited herein.

As an embodiment, the first counter may be PREAMBLE_TRANSMISSION_COUNTER, i.e., the conventional preamble transmission counter is reused.

In some embodiments, an initial value of the first counter is set to the number of PRACH transmissions in multiple PRACH transmissions for the first time, or the number of ROs, in the ROG, occupied by the multiple PRACH transmissions for the first time, or the number of RA preambles transmitted in an initial RACH attempt. It shall be understood that in embodiments of the present disclosure, the number of the PRACH transmissions, the number of the ROs, and the number of the RA preambles transmitted may be equal to each other.

As an embodiment, the initial value of the first counter is set to X0, and X0 is a positive integer greater than 1. For example, X0 can be at least one of $\{2, 4, 8\}$.

As an embodiment, the initial value of the first counter is set to a maximum value of the number of the RA preambles, or a maximum value of the number of PRACH transmissions, or a maximum value of the number of ROs occupied by the multiple PRACH transmissions.

In some embodiments, when the initial value of the first counter is a parameter of the initial RACH attempt, the initial value of the first counter is less than or equal to a current value of the first counter. The current value of the first counter may be a cumulative value of the first counter when the first node is making a current RACH attempt. For example, when the first node makes the initial RACH attempt, the current value of the first counter is equal to the initial value of the first counter. As another example, after a (N+1)-th (N>1) RACH attempt made by the first node, a current value of the first counter may be a cumulative value based on previous N RACH attempts, and in this case, the current value of the first counter is greater than the initial value of the first counter.

The updated value of the first counter is a value of the first counter after updated once based on the current value of the first counter. The value of the first counter may be updated according to a result of a reception of a channel access response after the RA preambles are currently transmitted, or before a next RACH attempt is planned to be started. For example, the value of the first counter may be updated in a scenario where the first RAR corresponding to the X1 first RA preambles is not received successfully.

In some embodiments, when the initial value of the first counter is the parameter in the initial RACH attempt, the value of the first counter is updated incrementally, that is, the value of the first counter is increased when the value of the first counter needs to be updated. A value to be increased of the first counter may be the number of the RA preambles corresponding to the next RACH attempt.

The current value of the first counter is increased by X2 to obtain the updated value of the first counter, which means that the sum of the current value of the first counter plus X2 is taken as the updated value of the first counter. X2 is equal to the number of PRACH transmissions in the multiple PRACH transmissions of the first node at the next time.

As an embodiment, the first node may determine X2 by receiving the first information. Exemplarily, the first information is configured to determine a plurality of candidate values, the plurality of candidate values including X2.

As an embodiment, the plurality of candidate values for X2 include at least one of $\{2, 4, 8\}$.

As an embodiment, the first information is configured to determine a plurality of candidate values, the plurality of candidate values including X1 and X2.

As an embodiment, the plurality of candidate values include at least two of $\{2, 4, 8\}$.

As an embodiment, X1 is equal to 2, and X2 is one of $\{4, 8\}$.

As an embodiment, X1 is equal to 4 and X2 is equal to 8.

In some embodiments, the number of PRACH transmissions in the current multiple PRACH transmissions in multiple retransmissions may be different from or the same as the number of PRACH transmissions in the previous multiple PRACH transmissions.

As an embodiment, in order to achieve coverage enhancement, the number of the PRACH transmissions of the current multiple PRACH retransmissions may be greater than the number of the PRACH transmissions of the previous multiple PRACH transmissions. For example, X2 is greater than X1.

As an embodiment, the number of the PRACH transmissions of the current multiple PRACH retransmissions may also be equal to the number of the PRACH transmissions of the previous multiple PRACH transmissions. For example, X2 equals X1.

As an embodiment, if the first time-window expires and the first node does not successfully receive the RAR, the preamble transmission counter may increase the number of PRACH transmissions in the next multiple PRACH transmissions for retransmissions, or the number of ROs in the ROG occupied by the next multiple PRACH transmissions for retransmissions. For example, if the number of the PRACH transmissions of the next multiple PRACH transmissions of the first node is X2, the first counter increases X2 on the basis of the current value to obtain the updated value.

As an embodiment, when the initial value of the first counter is the maximum number of PRACH transmissions or the maximum number of ROs, the value of the first counter is decreased when updating. That is, when the value of the first counter needs to be updated, the value of the first counter is decreased. The value to be decreased of the first counter may be equal to the number of RA preambles corresponding to a next RACH attempt.

In some embodiments, the first node may select a PRACH occasion based on an updating result of the value of the first counter. The PRACH occasion is also represented by the RO.

In some embodiments, after the initial value of the first counter is set to X0, the first node may select X0 ROs, and the X0 ROs are configured for the first RA procedure.

As an embodiment, the X0 ROs are configured to transmit X0 third RA preambles.

As an embodiment, the first RA procedure includes transmission of the X0 third RA preambles.

As an embodiment, the X0 third RA preambles are the same as the X1 first RA preambles.

As an embodiment, the X0 third RA preambles are different from the X1 first RA preambles.

As an embodiment, when the first counter is increased by X2 based on the current value, if the updated value of the first counter is less than a first threshold, the first node may select X2 ROs for transmission of X2 second RA preambles.

As an embodiment, the X2 second RA preambles are the same as the X1 first RA preambles.

As an embodiment, the X2 second RA preambles are different from the X1 first RA preambles.

A magnitude relationship between the updated value of the first counter and the first threshold is configured to determine whether to transmit the X2 second RA preambles. That is, the first node may determine whether to continue to make a new RACH attempt based on the updated value of the first counter obtained by the first counter in operations at S230 and the first threshold.

In some embodiments, whether to transmit the X2 second RA preambles by the first node means whether to perform multiple PRACH transmissions at the next time based on the X2 second RA preambles after multiple PRACH transmissions based on the X1 first RA preambles. Whether to transmit the X2 second RA preambles by the first node also means whether to perform multiple PRACH retransmissions by the first node. If the first node transmits the X2 second RA preambles, it is equivalent to indicate to continuing to perform multiple PRACH retransmissions. If the first node drops a transmission of the X2 second RA preambles, it is equivalent to abandon the multiple PRACH retransmissions.

As an embodiment, the magnitude relationship between the updated value of the first counter and the first threshold is configured to determine whether the first RA procedure is not successfully completed, the first threshold being configured by higher layer signaling.

As an embodiment, whether to transmit the X2 second RA preambles is equivalent to whether the first RA procedure is not successfully completed.

As an embodiment, the second RA preambles may be the same as the first RA preambles. That is, the preambles configured for multiple PRACH transmissions in retransmissions may be the same as the preambles in the multiple PRACH transmissions last time. For example, the second RA preambles are generated by a same RA preamble sequence as the first RA preambles.

As an embodiment, the second RA preambles may be different from the first RA preambles. That is, the preambles configured for multiple PRACH transmissions for retransmission may be the different from the preambles for the multiple PRACH transmissions last time. For example, the first node re-selects a preamble different from the first RA preamble as the second RA preamble.

As an embodiment, when the value of the first counter is updated by decreasing the value of the first counter, the initial value of the first counter is the first threshold, and a magnitude relationship between the updated value of the first counter and 0 is configured to determine whether to transmit the X2 second RA preambles.

The first threshold is configured by higher layer signaling. The higher layer signaling may be radio resource control (RRC) signaling. The RRC signaling indicates configuration parameters of a RRC information element (IE).

As an embodiment, the first threshold is configured by "preambleTransMax" in the RRC IE RACH-ConfigGeneric.

As an embodiment, the first threshold is indicated by second information. The second information may be "preambleTransMax" in the RRC IE, or the second information includes the "preambleTransMax".

As an embodiment, the first threshold is configured by newly introduced/configured RRC IE parameters.

In some embodiments, the first threshold is a maximum total number of PRACH transmissions, or a maximum total number of ROs, or a maximum total number of RA preambles transmitted.

The magnitude relationship between the updated value of the first counter and the first threshold is configured to determine whether to transmit the X2 second RA preambles, including: transmitting the X2 second RA preambles when the updated value of the first counter is less than the first threshold, and not transmitting the X2 second RA preambles (dropping transmission of the X2 second RA preambles) when the updated value of the first counter is greater than the first threshold.

As an embodiment, transmit the X2 second RA preambles when the updated value of the first counter is less than or equal to the first threshold. When the updated value of the first counter is greater than the first threshold, the X2 second RA preambles are not transmitted (transmission of the X2 second RA preambles is dropped).

As an embodiment, transmit the X2 second RA preambles when the updated value of the first counter is less than the first threshold. When the updated value of the first counter is equal to or greater than the first threshold, the X2 second RA preambles are not transmitted.

As an embodiment, the transmission of the X2 second RA preambles being dropped is equivalent to unsuccessful completion of the first RA procedure.

For the second node, when the first node transmits the X2 second RA preambles, the second node can perform reception of the X2 second RA preambles. When the first node drops transmission of the X2 second RA preambles, the second node drops reception of the X2 second RA preambles.

In some embodiments, when the updated value of the first counter is greater than the first threshold, the first node needs to indicate to upper layers so that the upper layers can determine whether the first RA procedure is successful.

As an embodiment, when the updated value of the first counter is greater than the first threshold, a RA problem is indicated to the upper layers.

As an embodiment, indicating the RA problem to the upper layers is equivalent to dropping transmission of the X2 second RA preambles.

As an embodiment, if the value of the first counter exceeds the maximum total number of PRACH transmissions or the maximum total number of ROs indicated by the second information, a RA problem (i.e., retransmission of multiple PRACH transmissions is abandoned) is indicated to the upper layers. If the value of the first counter does not exceed the maximum total number of PRACH transmissions or the maximum total number of ROs indicated by the second information, retransmission of the multiple PRACH transmissions is performed.

In some embodiments, if the first node successfully receives the first RAR during the first time-window, it indicates that the first RA procedure is successfully completed.

As an embodiment, when the first RAR is successfully received during the first time-window, the first time-window is stopped. For example, the MAC entity determines whether the first time-window is started or stopped based on a result of execution of the first RA procedure.

As an embodiment, stopping the first time-window refers to that the MAC entity stops monitoring the time-window for the first RAR.

For the second node, when the first RAR is successfully transmitted during the first time-window, the first time-window is stopped.

As can be seen from FIG. 2, in the embodiments of the present disclosure, no matter how many PRACH transmissions of the multiple PRACH transmissions are, the first node can control the total number of PRACH transmissions or the total number of ROs occupied, thereby reducing unnecessary resource waste in the multiple PRACH retransmissions as much as possible, and avoiding causing unnecessary confliction of the PRACH preambles, so as to optimize resource allocation.

Figure 3:
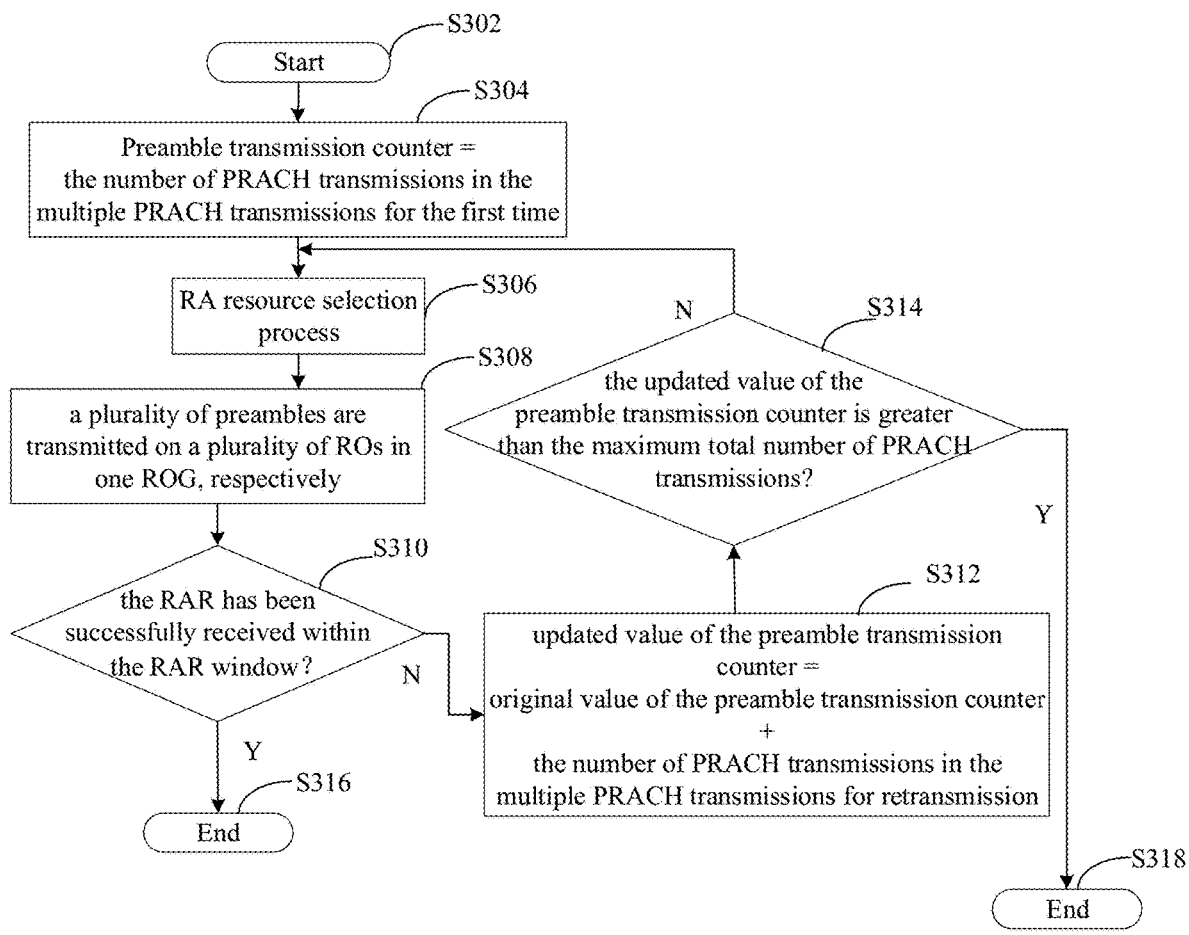
FIG. 3 is a flow chart of a possible implementation of the method in FIG. 2.

For ease of understanding, a scheme in which the total number of PRACH transmissions of all multiple PRACH transmissions in multiple RACH attempts is configured to determine whether to perform multiple PRACH retransmissions is illustrated below in conjunction with FIG. 3. FIG. 3 is a flow chart of a possible implementation of the method of the embodiments of the present disclosure by the first node.

Referring to FIG. 3, at S302, a first RA procedure is started.

At S304, a value of a preamble transmission counter is set to the number of PRACH transmissions in multiple PRACH transmissions for the first time. The preamble transmission counter is a first counter.

At S306, the method proceeds to a RA resource selection process.

At S308, a plurality of preambles are transmitted on a plurality of ROs in one ROG, respectively. Preambles transmitted in different times are different or the same.

At S310, whether a RAR has been successfully received within a RAR time-window is determined. If the RAR is successfully received, the method proceeds to operations at S316. If the RAR is not received successfully within the RAR time-window, the method proceeds to operations at S312.

At S312, the value of the preamble transmission counter is updated. An updated value of the preamble transmission counter is a sum of the number of PRACH transmissions in multiple PRACH transmissions for retransmission with an original value of the preamble transmission counter. The number of PRACH transmissions in the multiple PRACH transmissions for retransmission may be different from or the same as the number of PRACH transmissions in multiple PRACH transmissions last time.

At S314, whether the updated value of the preamble transmission counter is greater than the maximum total number of PRACH transmissions is determined. If yes, the method proceeds to operations at S318. If not, the method proceeds to operations at S306 to S310.

At S316, if the RAR is successfully received within the RAR time-window, the RA procedure is deemed to be successfully completed, so the first RA procedure ends.

At S318, if the RAR is not received successfully during the RAR time-window, and the updated value of the preamble transmission counter exceeds the maximum total number of PRACH transmissions, the multiple PRACH transmissions for retransmission are dropped. In this case, a RA problem is indicated to the upper layers, the RA procedure is considered to be unsuccessfully completed, and the first RA procedure ends.

The method of determining whether to perform multiple PRACH retransmissions based on the total number of PRACH transmissions has been described previously in conjunction with FIGS. 2 and 3. Embodiments of the present disclosure further provide a method in which the total number of PRACH transmissions of all multiple PRACH transmissions and the maximum number of transmissions are both configured to determine whether to perform multiple PRACH retransmissions. For the sake of brevity, the terms already explained in FIG. 2 will not be repeated in the embodiments of the present method.

After operations at S230 shown in FIG. 2, a current value of a second counter is increased by 1 to obtain an updated value of the second counter.

The second counter is configured for the first node to count the number of times all multiple PRACH transmissions in the multiple RACH attempts are made (the number of transmissions), i.e., the number of times the first node transmits RA preambles, or the number of times RACH attempts are made.

As an embodiment, the first counter and the second counter cooperate with each other, so that the first node comprehensively considers the number of PRACH transmissions and the number of times the multiple PRACH transmissions are made when determining whether to perform multiple PRACH retransmissions.

As an embodiment, when the first counter is a conventional preamble transmission counter of the first node, the second counter is a newly set transmission times counter of the first node.

As an embodiment, when the first counter is a newly set PRACH transmission counter of the first node, the second counter is a conventional preamble transmission counter, and setting of the preamble transmission counter does not need to be adjusted.

The second counter can be PREAMBLE_TRANSMISSION_COUNTER.

As an embodiment, an initial value of the second counter is set to 1, which is consistent with a conventional setting of the preamble transmission counter.

As an embodiment, the initial value of the second counter is set to a maximum number of transmissions.

In some embodiments, when the initial value of the second counter is 1, the initial value of the second counter is less than or equal to the current value of the second counter. The current value of the second counter may be a cumulative number of times RACH attempts including a current RACH attempt are made by the first node. For example, when the first node makes the initial RACH attempt, the current value of the second counter is equal to 1. The initial value of the second counter is the same as the current value of the second counter. As another example, when the first node makes a N-th (N>1) RACH attempt, a current value of the second counter may be N, and in this case, the current value of the second counter is greater than the initial value of the second counter.

The updated value of the second counter is a value of the second counter after updated once based on the current value of the second counter. The value of the second counter can be updated according to a result of reception of a channel access response after the RA preambles are currently transmitted, or updated before the next RACH attempt is planned to be started, or updated in a scenario where the updated value of the first counter is less than the first threshold. For example, in a scenario where the first RAR corresponding to the X1 first RA preambles is not received successfully, if the updated value of the first counter is less than the first threshold, the value of the second counter is updated.

In some embodiments, when the initial value of the second counter is 1, the value of the second counter is updated by increasing the value of the second counter.

The current value of the first counter is increased by 1 to obtain an updated value of the first counter, which means that the first counter takes the sum of the current value and 1 as the updated value of the first counter.

As an embodiment, if the first time-window expires, the first node does not successfully receive a RAR, the value of the second counter (e.g., the preamble transmission counter) is increased by 1, and the value of the first counter (e.g., PRACH transmission counter) is increased by the number of PRACH transmissions in multiple PRACH transmissions in a next retransmission, or increased by the number of ROs, in the ROG, occupied by the multiple PRACH transmissions in the next retransmission.

As an embodiment, when the initial value of the second counter is the maximum number of transmissions, the value of the second counter is updated by decreasing, that is, the value of the second counter is decreased by 1 during updating.

A magnitude relationship between the updated value of the second counter and the second threshold is configured to determine whether to transmit the X2 second RA preambles. That is, the first node may determine whether to continue to make another RACH attempt according to the updated value of the second counter and the second threshold. The second threshold is configured by higher layer signaling.

In some embodiments, the magnitude relationship between the updated value of the second counter and the sum of the second threshold plus 1 is configured to determine whether to transmit X2 second RA preambles. Alternatively, whether the updated value of the second counter is equal to the sum of the second threshold plus 1 is configured to determine whether to transmit the X2 second RA preambles.

As an embodiment, the magnitude relationship between the updated value of the second counter and the sum of the second threshold plus 1 is configured to determine whether the first RA procedure is not successfully completed. The second threshold is configured by higher layer signaling.

As an embodiment, when the value of the second counter is updated by decreasing the value of the second counter, the initial value of the second counter is the second threshold, and a magnitude relationship between the updated value of the second counter and 0 is configured to determine whether to transmit X2 second RA preambles.

The second threshold is configured by higher layer signaling. The higher layer signaling may be RRC signaling.

As an embodiment, when the second counter is a preamble transmission counter, for the configuration of the second threshold, reference may be made to the configuration of the preamble transmission counter. For example, the second threshold is configured by "preambleTransMax" in the RRC IE RACH-ConfigGeneric, and the first threshold is configured by newly configured RRC IE parameters.

As an embodiment, the second threshold is indicated by the second information. The second information may be "preambleTransMax" in the RRC IE. When the second information includes the "preambleTransMax", the first threshold is indicated by third information. For example, the second information indicates the maximum number of transmissions and the third information indicates the maximum number of PRACH transmissions.

As an embodiment, when the first threshold is configured by "preambleTransMax", the second threshold is configured by newly configured RRC IE parameters.

As an embodiment, the first threshold is indicated by the second information described above, and the second threshold is indicated by the third information.

As an embodiment, the second threshold is equal to the maximum number of transmissions for all multiple PRACH transmissions.

The magnitude relationship between the updated value of the second counter and the sum of the second threshold plus 1 is used to determine whether to transmit the X2 second RA preambles, including: dropping the transmission of the X2 second RA preambles when the updated value of the second counter is greater than the second threshold. Alternatively, the magnitude relationship between the updated value of the second counter and the second threshold and the magnitude relationship between the updated value of the first counter and the first threshold are both used to determine whether to transmit the X2 second RA preambles.

As an embodiment, transmit the X2 second RA preambles when the updated value of the first counter is less than the first threshold and the updated value of the second counter is not equal to the sum of the second threshold plus 1. When the updated value of the first counter is greater than the first threshold or the updated value of the second counter is equal to the sum of the second threshold plus 1, the transmission of the X2 second RA preambles are dropped.

As an embodiment, transmit the X2 second RA preambles when the updated value of the first counter is less than or equal to the first threshold and the updated value of the second counter is not equal to the sum of the second threshold plus 1. When the updated value of the first counter is greater than the first threshold or the updated value of the second counter is equal to the sum of the second threshold plus 1, the transmission of the X2 second RA preambles are dropped.

As an embodiment, transmit the X2 second RA preambles when the updated value of the first counter is less than the first threshold and the updated value of the second counter is not equal to the sum of the second threshold plus 1. When the updated value of the first counter is equal to or greater than the first threshold or the updated value of the second counter is equal to the sum of the second threshold plus 1, the transmission of the X2 second RA preambles are dropped.

As an embodiment, transmit the X2 second RA preambles when the updated value of the first counter is less than the first threshold and the updated value of the second counter is less than the sum of the second threshold plus 1. When the updated value of the first counter is greater than the first threshold or the updated value of the second counter is equal to the sum of the second threshold plus 1, the transmission of the X2 second RA preambles are dropped.

As an embodiment, transmit the X2 second RA preambles when the updated value of the first counter is less than or equal to the first threshold and the updated value of the second counter is less than the sum of the second threshold plus 1. When the updated value of the first counter is greater than the first threshold or the updated value of the second counter is equal to the sum of the second threshold plus 1, the transmission of the X2 second RA preambles are dropped.

As an embodiment, transmit the X2 second RA preambles when the updated value of the first counter is less than the first threshold and the updated value of the second counter is less than the sum of the second threshold plus 1. When the updated value of the first counter is equal to or greater than the first threshold or the updated value of the second counter is equal to the sum of the second threshold plus 1, the transmission of the X2 second RA preambles are dropped.

In some embodiments, when the updated value of the second counter is greater than the second threshold, the first node needs to indicate to the upper layers so that the upper layers can determine whether the first RA procedure is successful.

As an embodiment, a RA problem is indicated to the upper layers when the updated value of the second counter is equal to the sum of the second threshold plus 1.

As an embodiment, a RA problem is indicated to the upper layers when the updated value of the first counter is greater than the first threshold or the updated value of the second counter is equal to the sum of the second threshold plus 1.

As an embodiment, a RA problem is indicated to the upper layers when the updated value of the first counter is equal to or greater than the first threshold or the updated value of the second counter is equal to the sum of the second threshold plus 1.

As an embodiment, if the value of the second counter (e.g., the preamble transmission counter) exceeds the maximum number of transmissions, or if the value of the first counter (e.g., the PRACH transmission counter) exceeds the maximum total number of PRACH transmissions or the maximum total number of ROs, a RA problem is indicated to the upper layers (i.e., multiple PRACH transmissions for retransmissions are abandoned). If the value of the second counter (e.g., the preamble transmission counter) does not exceed the maximum number of transmissions and the value of the first counter (e.g., the PRACH transmission counter) does not exceed the maximum total number of PRACH transmissions or the maximum total number of ROs, the multiple PRACH transmissions for retransmission are performed.

In embodiments of the method described above, regardless of the number of PRACH transmissions of the multiple PRACH transmissions, the first node can control the maximum number of transmissions and the total number of PRACH transmissions or the total number of ROs occupied, which is beneficial to balance the resource consumption of the multiple PRACH retransmissions and the validity of RA.

Figure 4:
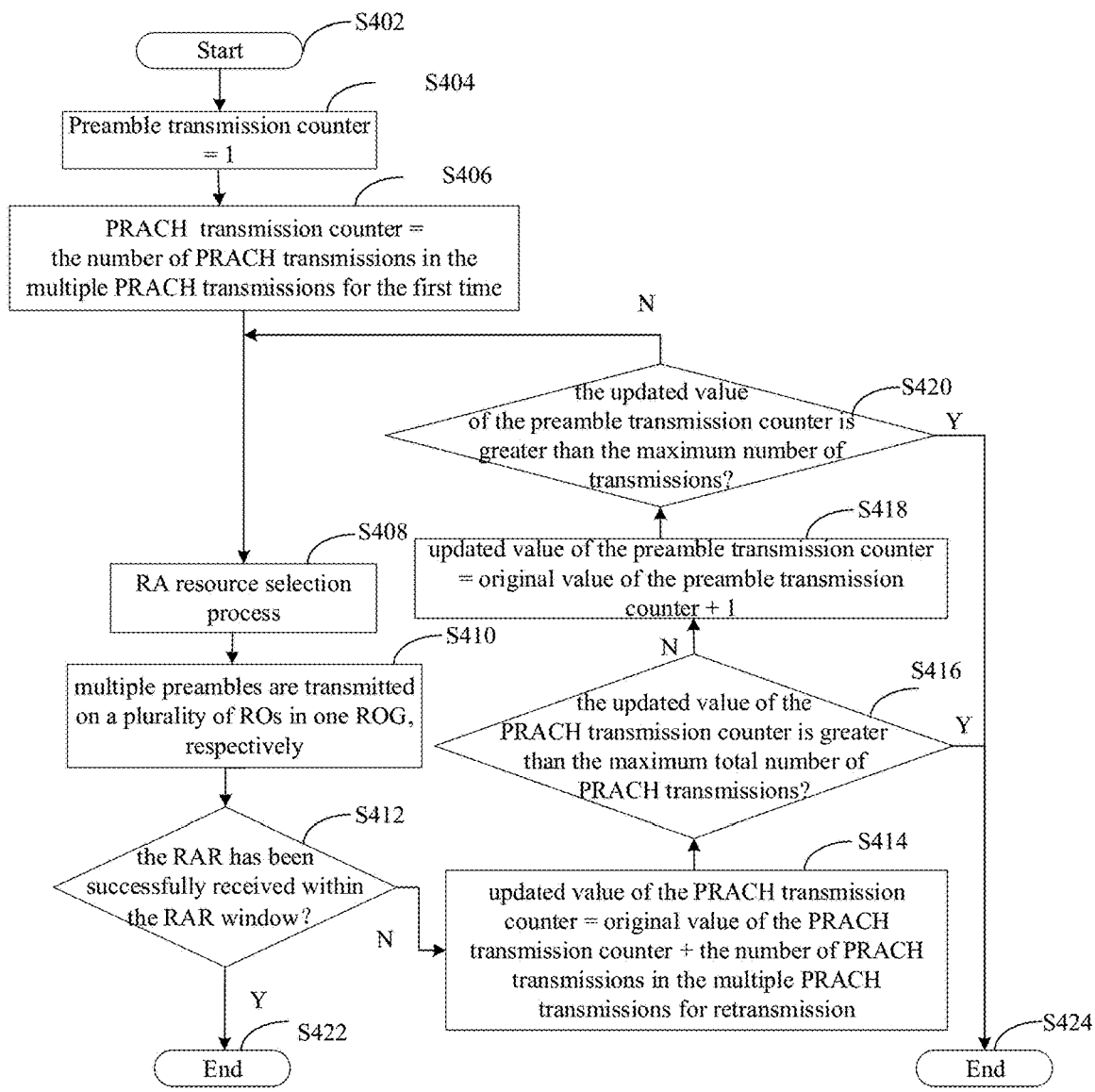
FIG. 4 is a flow chart of another possible implementation of the method in FIG. 2.

For ease of understanding, a scheme in which the total number of PRACH transmissions of all multiple PRACH transmissions and the maximum number of times all multiple PRACH transmissions are made in multiple RACH attempts are collectively configured to determine whether to perform multiple PRACH retransmissions is illustrated below in conjunction with FIG. 4. FIG. 4 is a flow chart illustrating another possible implementation of the method of the embodiment of the present disclosure by the first node.

Referring to FIG. 4, at S402, a first RA procedure starts.

At S404, a value of a preamble transmission counter is set to 1. The preamble transmission counter is a second counter.

At S406, a value of a PRACH transmission counter is set to the number of PRACH transmissions in multiple PRACH transmissions for the first time. The PRACH transmission counter is a first counter.

At S408, a RA resource selection process is performed.

At S410, multiple preambles are transmitted on a plurality of ROs in one ROG, respectively. The preambles transmitted in different times are different or the same.

At S412, whether the RAR has been successfully received during the RAR time-window is determined. If the RAR is successfully received, the method proceeds to operations at S422. If the RAR has been not successfully received during the RAR time-window, the method proceeds to operations at S414.

At S414, the value of the PRACH transmission counter is updated. The updated value of the PRACH transmission counter is a sum of the number of PRACH transmissions in the multiple PRACH transmissions for retransmission and an original value of the PRACH transmission counter. The number of PRACH transmissions in the multiple PRACH transmissions for retransmission may be different from or the same as the number of PRACH transmissions in multiple PRACH transmissions last time.

At S416, whether the updated value of the PRACH transmission counter is greater than the maximum total number of PRACH transmissions is determined. If yes, the method proceeds to operations at S424. If not, the method proceeds to operations at S418.

At S418, the value of the preamble transmission counter is updated. The updated value of the preamble transmission counter is the sum of the original value of the preamble transmission counter plus 1.

At S420, whether the updated value of the preamble transmission counter is greater than the maximum number of transmissions is determined. If yes, the method proceeds to operations at S424. If not, the method proceeds to operations at S408 to S412.

At S422, if the RAR is successfully received within the RAR time-window, the RA procedure is considered to be successfully completed, so the first RA procedure ends.

At S424, if the RAR is not successfully received within the RAR time-window, and the value of the PRACH transmission counter exceeds the maximum total number of PRACH transmissions or the value of the preamble transmission counter exceeds the maximum number of transmissions, the multiple PRACH transmissions for retransmission are abandoned. In this case, a RA problem is indicated to the upper layers, the RA procedure is considered to be unsuccessfully completed, and the first RA procedure ends.

With the method embodiments described above, the total resources occupied by multiple PRACH transmissions/retransmissions can be controlled, thereby avoiding invalid repeated transmissions, avoiding consuming a large amount of resources, and avoiding worsening preamble collisions.

The embodiments of the method of the present disclosure are described in detail above with reference to FIGS. 1 to 4 and the embodiments of the device of the present disclosure are described in detail below with reference to FIGS. 5 to 8. It shall be understood that the description of the embodiments of the method and the description of the embodiments of the device correspond to each other. Therefore, for the part not described in detail of the embodiments of the device, reference may be made to the embodiments of the method described above.

Figure 5:
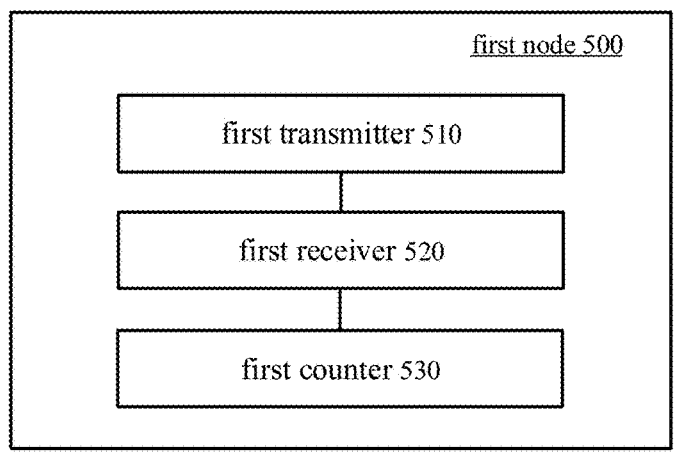
FIG. 5 is a schematic structural diagram of a first node for wireless communication according to an embodiment of the present disclosure.

FIG. 5 is a schematic structural diagram of a first node for wireless communication according to an embodiment of the present disclosure. As shown in FIG. 5, the first node 500 includes a first transmitter 510, a first receiver 520, and a first counter 530.

The first transmitter 510 is configured to transmit X1 first RA preambles, X1 being a positive integer greater than 1.

The first receiver 520 is configured to monitor/receive a control signaling for a first RAR during a first time-window, where the first RAR corresponds to the X1 first RA preambles.

The first counter 530 is configured to increase, in response to unsuccessful reception of the first RAR and expiration of the first time-window, a current value of the first counter 530 by X2 to obtain an updated value of the first counter 530, X2 being a positive integer greater than or equal to X1.

The magnitude relationship between the updated value of the first counter 530 and the first threshold is configured to determine whether to transmit X2 second RA preambles, the first threshold being configured by higher layer signaling.

As an embodiment, the first transmitter 510 is further configured to transmit the X2 second RA preambles when the updated value of the first counter 530 is less than or equal to the first threshold, and drop transmission of the X2 second RA preambles when the updated value of the first counter 530 is greater than the first threshold.

As an embodiment, the first node 500 further includes a second counter configured to increase a current value of the second counter by 1 to obtain an updated value of the second counter. A magnitude relationship between the updated value of the second counter and the sum of the second threshold plus 1 is configured to determine whether to transmit the X2 second RA preambles. Alternatively, whether the updated value of the second counter is equal to the sum of the second threshold plus 1 is configured to determine whether to transmit the X2 second RA preambles, where the second threshold is configured by higher layer signaling.

As an embodiment, an initial value of the second counter is configured to be set to 1, where the initial value of the second counter is less than or equal to a current value of the second counter.

As an embodiment, the first transmitter 510 is further configured to transmit the X2 second RA preambles when the updated value of the first counter is less than the first threshold and the updated value of the second counter is not equal to the sum of the second threshold plus 1. The first transmitter 510 is further configured to drop transmission of the X2 second RA preambles when the updated value of the first counter is greater than the first threshold or the updated value of the second counter is equal to the sum of the second threshold plus 1.

As an embodiment, the first node 500 further includes a first processor configured to indicate a RA problem to upper layers when the updated value of the second counter is equal to the sum of the second threshold plus 1.

As an embodiment, an initial value of the first counter 530 is configured to be set to X0, and X0 is a positive integer greater than 1. The initial value of the first counter 530 is less than or equal to a current value of the first counter 530. The first node 500 further includes a second processor. The second processor is configured to select X0 PRACH occasions (ROs), where the X0 ROs are configured for the first RA procedure.

As an embodiment, the first node 500 further includes a third processor. The third processor is configured to indicate a RA problem to upper layers when the updated value of the first counter 530 is greater than the first threshold.

As an embodiment, the first node 500 further includes a fourth processor. The fourth processor is configured to stop the first time-window when the first RAR is successfully received during the first time-window.

As an embodiment, the first receiver 520 is further configured to receive first information, where the first information is configured to determine a plurality of candidate values including X1 and X2.

As an embodiment, the first transmitter 510 and the first receiver 520 may be a transceiver 730. The first node 500 may further include a processor 710 and a memory 720 as illustrated in particular in FIG. 7.

Figure 6:
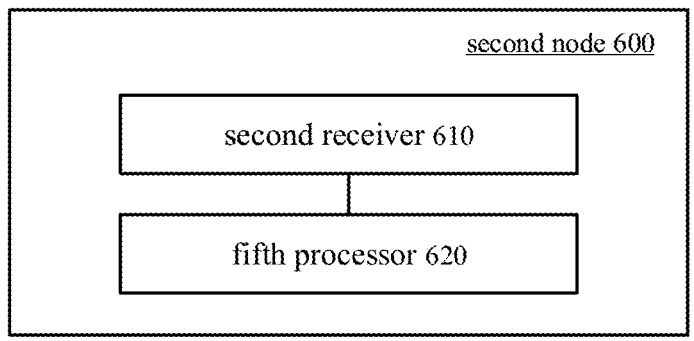
FIG. 6 is a schematic structural diagram of a second node for wireless communication according to an embodiment of the present disclosure.

FIG. 6 is a schematic structural diagram of a second node for wireless communication according to an embodiment of the present disclosure. As shown in FIG. 6, the second node 600 includes a second receiver 610 and a fifth processor 620.

The second receiver 610 is configured to perform reception of the X1 first RA preambles, X1 being a positive integer greater than 1.

The fifth processor 620 is configured to determine whether to transmit a control signaling for a first RAR during the first time-window based on a result of the reception of the X1 first RA preambles, where the first RAR corresponds to the X1 first RA preambles.

When the first time-window expires, and the control signaling for the first RAR is not successfully transmitted, the magnitude relationship between the updated value of the first counter of the first node transmitting the X1 first RA preambles and the first threshold is configured to determine whether to receive X2 second RA preambles, X2 being a positive integer greater than or equal to X1, the first threshold being configured by higher layer signaling.

As an embodiment, the second receiver 610 is further configured to perform reception of the X2 second RA preambles when the updated value of the first counter is less than the first threshold, and drop the reception of X2 second RA preambles when the updated value of the first counter is greater than the first threshold.

As an embodiment, the magnitude relationship between the updated value of the second counter of the first node and the sum of the second threshold plus 1 is configured to determine whether to perform reception of the X2 second RA preambles, or whether the updated value of the second counter of the first node is equal to the sum of the second threshold plus 1 is configured to determine whether to receive the X2 second RA preambles, the second threshold being configured by higher layer signaling.

As an embodiment, the second receiver 610 is further configured to perform reception of the X2 second RA preambles when the updated value of the first counter is less than the first threshold and the updated value of the second counter is not equal to the sum of the second threshold plus 1. The second receiver 610 is further configured to drop the reception of the X2 second RA preambles when the updated value of the first counter is greater than the first threshold or the updated value of the second counter is equal to the sum of the second threshold plus 1.

As an embodiment, the fifth processor 620 is further configured to stop the first time-window when the control signaling for the first RAR is successfully transmitted during the first time-window.

As an embodiment, the second node 600 further includes a second transmitter. The second transmitter is configured to transmit first information. The first information is configured to determine a plurality of candidate values. The plurality of candidate values include X1 and X2.

As an embodiment, the second receiver 610 may be a transceiver 730 and the fifth processor 620 may be a processor 710. The second node 600 may further include a memory 720 as shown in FIG. 7 in particular.

Figure 7:
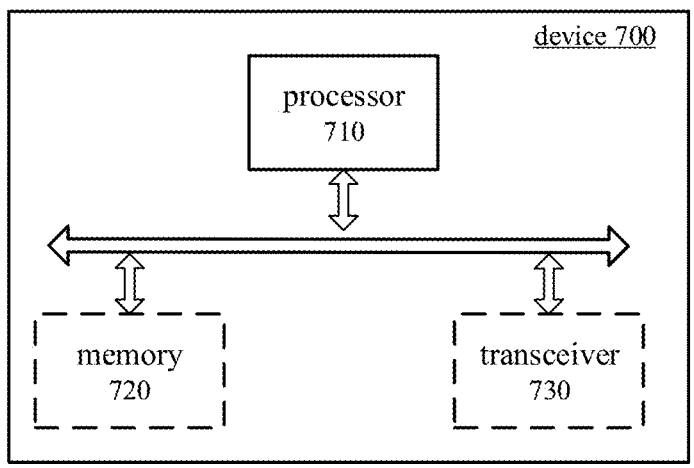
FIG. 7 is a schematic structural diagram of a device according to an embodiment of the present disclosure.

FIG. 7 is a schematic structural diagram of a communication device according to an embodiment of the present disclosure. The dotted line in FIG. 7 indicates that the unit or module is optional. The device 700 may be configured to implement the methods described in the above method embodiments. The device 700 may be a chip, a UE, or a network device.

The device 700 may include one or more processors 710. The processor 710 may support the device 700 to implement the methods described previously in the method embodiments. The processor 710 may be a general-purpose processor or a special purpose processor. For example, the processor may be a central processing unit (CPU). Alternatively, the processor may also be other general-purpose processors, digital signal processors (DSP), application specific integrated circuits (ASIC), field programmable gate arrays (FPGA), or other programmable logic devices, discrete gate, or transistor logic devices, discrete hardware components, and the like. The general-purpose processor may be a microprocessor, or the processor may be any conventional processor or the like.

The device 700 may further include one or more memories 720. The memory 720 stores a program that can be executed by the processor 710, such that the processor 710 performs the methods described previously in the method embodiments. The memory 720 may be independent of the processor 710 or may be integrated into the processor 710.

The device 700 may further include a transceiver 730. The processor 710 may communicate with other devices or chips through the transceiver 730. For example, the processor 710 may transmit and receive data with other devices or chips through the transceiver 730.

Figure 8:
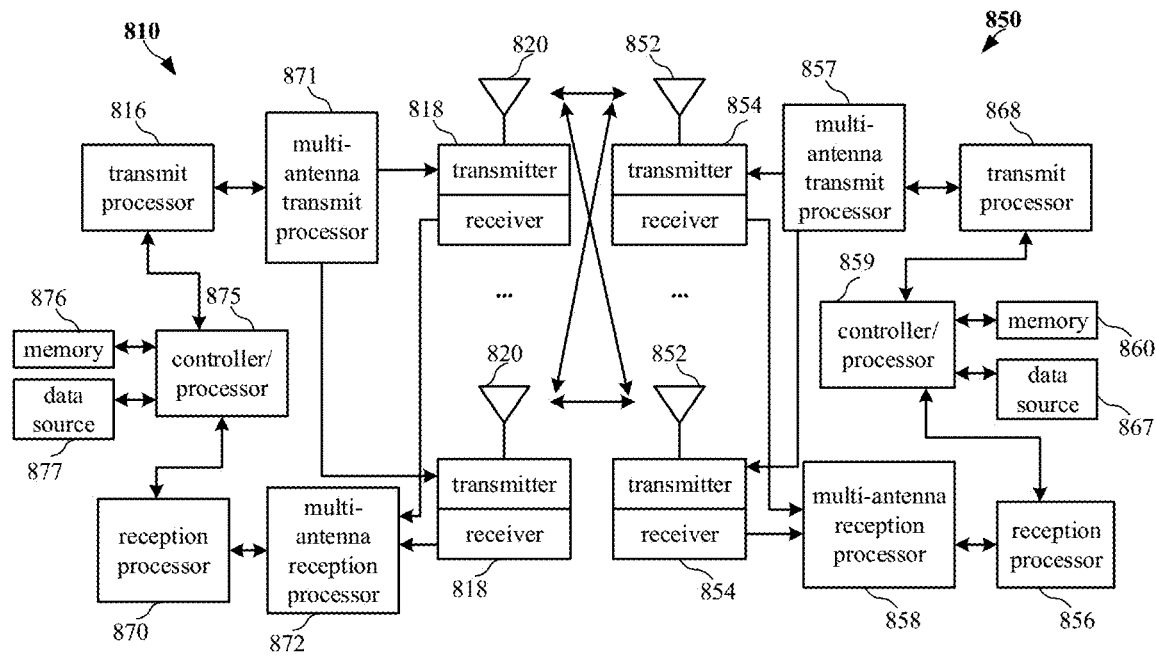
FIG. 8 is a schematic diagram of a hardware module of a communication device according to an embodiment of the present disclosure.

FIG. 8 is a schematic diagram of a hardware module of a communication device according to an embodiment of the present disclosure. Specifically, FIG. 8 illustrates a block diagram of a first communication device 850 and a second communication device 810 communicating with each other in an access network.

The first communication device 850 includes a controller/processor 859, a memory 860, a data source 867, a transmit processor 868, a reception processor 856, a multi-antenna transmit processor 857, a multi-antenna reception processor 858, a transmitter/receiver 854, and an antenna 852.

The second communication device 810 includes a controller/processor 875, a memory 876, a data source 877, a reception processor 870, a transmit processor 816, a multi-antenna reception processor 872, a multi-antenna transmit processor 871, a transmitter/receiver 818, and an antenna 820.

In the transmission from the second communication device 810 to the first communication device 850, at the second communication device 810, upper layer data packets from the core network or upper layer data packets from the data source 877 are provided to the controller/processor 875. The core network and the data source 877 represent all protocol layers above the L2 layer. The controller/processor 875 implements the functionality of the L2 layer. In transmissions from the second communication device 810 to the first communication device 850, the controller/processor 875 is configured to provide header compression, encryption, packet segmentation and reordering, multiplexing between logic and transport channels, and radio resource allocation to the first communication device 850 based on various priority metrics. The controller/processor 875 is also responsible for re-transmission of lost packets and signaling to the first communication device 850. The transmit processor 816 and the multi-antenna transmit processor 871 implement various signal processing functions for the L1 layer (i.e., the physical layer). The transmit processor 816 implements encoding and interleaving to facilitate forward error correction at the second communication device 810, as well as mapping of signal clusters based on various modulation schemes (e.g., binary phase shift keying, quadrature phase shift keying, multiple phase shift keying, multiple quadrature amplitude modulation). The multi-antenna transmit processor 871 performs digital spatial pre-coding, including codebook-based and non-codebook-based pre-coding, and beamforming processing on the encoded and modulated symbols to generate one or more spatial streams. The transmit processor 816 then maps each spatial stream to sub-carriers, multiplexes the modulated symbols with reference signals (e.g., pilots) in the time domain and/or frequency domain, and then performs inverse fast Fourier transform to generate a physical channel carrying time domain multi-carrier symbol streams. The multi-antenna transmit processor 871 then performs a transmit analog pre-coding/beamforming operation on the time domain multi-carrier symbol streams. Each transmitter 818 converts a baseband multicarrier symbol stream provided by the multi-antenna transmit processor 871 into a radio frequency stream to be provided to different antennas 820.

In the transmission from the second communication device 810 to the first communication device 850, at the first communication device 850, each receiver 854 receives signals through a respective antenna 852. Each receiver 854 recovers information modulated onto the RF carrier and converts the RF stream into a baseband multi-carrier symbol stream for provision to a reception processor 856. The reception processor 856 and the multi-antenna reception processor 858 implement various signal processing functions of the L1 layer. The multi-antenna reception processor 858 performs a received analog pre-coding/beamforming operation on a baseband multi-carrier symbol stream from a receiver 854. The reception processor 856 performs fast Fourier transform (FFT) to convert the baseband multi-carrier symbol stream subjected to the received analog pre-coding/beamforming operation from the time domain to the frequency domain. In the frequency domain, the data signal and the reference signal of the physical layer are demultiplexed by the reception processor 856, where the reference signal is to be used for channel estimation, and the data signal is recovered from any spatial stream destined for the first communication device 850 after being detected by multiple antennas in the multi-antenna reception processor 858. The symbols on each spatial stream are demodulated and recovered in the reception processor 856 to generate a soft decision. The soft decision is then decoded and deinterleaved by the reception processor 856 to recover upper layer data and control signals transmitted by the second communication device 810 on the physical channel. The upper layer data and control signals are then provided to the controller/processor 859. The controller/processor 859 implements the functions of the L2 layer. The controller/processor 859 may be associated with a memory 860 that stores program code and data. The memory 860 may be referred to as a computer readable medium. In transmissions from the second communication device 810 to the first communication device 850, the controller/processor 859 provides demultiplexing between transmission and logical channels, packet reassembly, decryption, header decompression, and control signal processing to recover upper layer data packets from the second communication device 810. The upper layer packets are then provided to all protocol layers above L2 layer. Various control signals may also be provided to L3 layer for L3 processing.

In the transmission from the first communication device 850 to the second communication device 810, at the first communication device 850, upper layer data packets are provided to the controller/processor 859 from a data source 867. The data source 867 represents all protocol layers above the L2 layer. Similar to the transmission functionality at the second communication device 810 described in the transmission from the second communication device 810 to the first communication device 850, the controller/processor 859 implements header compression, encryption, packet segmentation and reordering, and multiplexing between logic and transmission channels, implementing L2 layer functionality for the user plane and the control plane. The controller/processor 859 is also responsible for retransmission of lost packets and signaling to the second communication device 810. The transmit processor 868 performs modulation mapping, channel coding processing, and the multi-antenna transmit processor 857 performs digital multi-antenna spatial pre-coding, including codebook-based pre-coding and non-codebook-based pre-coding, and beamforming processing. The transmit processor 868 then modulates the generated spatial stream into a multi-carrier/single-carrier symbol stream, the multi-carrier/single-carrier symbol stream is provided to different antennas 852 via the transmitter 854 after subjected to analog pre-coding/beamforming operations in the multi-antenna transmit processor 857. Each transmitter 854 first converts the baseband symbol stream provided by the multi-antenna transmit processor 857 into a radio frequency symbol stream which is then provided to the antenna 852.

In the transmission from the first communication device 850 to the second communication device 810, the function at the second communication device 810 is similar to the reception function at the first communication device 850 described in the transmission from the second communication device 810 to the first communication device 850. Each receiver 818 receives a radio frequency signal through a respective antenna 820, converts the received radio frequency signal into a baseband signal, and provides the baseband signal to a multi-antenna reception processor 872 and the reception processor 870. The reception processor 870 and the multi-antenna reception processor 872 jointly implement the function of the L1 layer. The controller/processor 875 implements functions of the L2 layer. The controller/processor 875 may be associated with the memory 876 that stores program code and data. The memory 876 may be referred to as a computer readable medium. In transmissions from the first communication device 850 to the second communication device 810, the controller/processor 875 provides demultiplexing between transmission and logical channels, packet reassembly, decryption, header decompression, control signal processing to recover upper layer data packets from the first communication device 850. The upper layer data packets from controller/processor 875 may be provided to the core network or all protocol layers above the L2 layer and various control signals may be provided to the core network or L3 layer for L3 processing.

As an embodiment, the first communication device 850 includes at least one processor and at least one memory, the at least one memory including computer program codes. The at least one memory and the computer program codes are configured for use with the at least one processor, the first communication device 850 at least: transmitting X1 first RA preambles, X1 being a positive integer greater than 1; monitoring a control signaling for a first RAR during a first time-window, the first RAR corresponding to the X1 first RA preambles; and increasing a current value of the first counter by X2 to obtain an updated value of the first counter when the first time-window expires and the first RAR is not successfully received, where X2 is a positive integer greater than or equal to X1. A magnitude relationship between the updated value of the first counter and a first threshold is configured to determine whether to transmit X2 second RA preambles, the first threshold being configured by higher layer signaling.

As an embodiment, the first communication device 850 includes: a memory storing a computer-readable instruction program which, when executed by at least one processor, generates actions including: transmitting X1 first RA preambles, X1 being a positive integer greater than 1; monitoring a control signaling for a first RAR during a first time-window, the first RAR corresponding to the X1 first RA preambles; and increasing a current value of the first counter by X2 to obtain an updated value of the first counter when the first time-window expires and reception of the first RAR is not successful, where X2 is a positive integer greater than or equal to X1. A magnitude relationship between the updated value of the first counter and a first threshold is configured to determine whether to transmit X2 second RA preambles, the first threshold being configured by higher layer signaling.

As an embodiment, the first communication device 850 corresponds to the first node in the present disclosure.

As an embodiment, the second communication device 810 corresponds to the second node in the present disclosure.

As an embodiment, the first communication device 850 is a UE which may act as a relay node.

As an embodiment, the first communication device 850 is a V2X-enabled UE which may act as a relay node.

As an embodiment, the first communication device 850 is a D2D-enabled UE which may act as a relay node.

As an embodiment, the first communication device 850 is a network control relay NCR.

As an embodiment, the first communication device 850 is a relay wireless repeater.

As an embodiment, the first communication device 850 is a relay.

As an embodiment, the second communication device 810 is a base station.

As an embodiment, the antenna 852, the transmitter 854, the multi-antenna transmit processor 857, the transmit processor 868, and the controller/processor 859 are configured to transmit the X1 first RA preambles of the present disclosure.

As an embodiment, the antenna 820, the receiver 818, the multi-antenna reception processor 872, the reception processor 870, and the controller/processor 875 are configured to perform reception of the X1 first RA preambles in the present disclosure.

As an embodiment, the antenna 852, the receiver 854, the multi-antenna reception processor 858, the reception processor 856, and the controller/processor 859 are configured to monitor a first RAR in the present disclosure within a first time-window.

As an embodiment, the antenna 820, the transmitter 818, the multi-antenna transmit processor 871, the transmit processor 816, and the controller/processor 875 are configured to determine whether to transmit the first RAR of the present disclosure within a first time-window.

The embodiments of the disclosure further provide a computer-readable storage medium for storing programs. The computer-readable storage medium may be applied to a terminal or network device according to an embodiment of the present disclosure, and the programs cause a computer to perform the method performed by the terminal or network device in various embodiments of the present disclosure.

The embodiments of the disclosure further provide a computer program product. The computer program product includes programs. The computer program product may be applied to a terminal or network device provided by embodiments of the present disclosure, and the programs cause a computer to perform the method performed by the terminal or network device in various embodiments of the present disclosure.

The embodiments of the disclosure further provide a computer program. The computer program may be applied to a terminal or network device according to an embodiment of the present disclosure, and the computer program causes a computer to perform the method performed by the terminal or network device in various embodiments of the present disclosure.

It shall be understood that the terms "system" and "network" in this disclosure may be used interchangeably. In addition, the terms used herein are used only for explanation of specific embodiments of the present disclosure and are not intended to be limiting. The terms "first", "second", "third", "fourth" and the like in the specification and claims of the present disclosure and the accompanying drawings are used to distinguish different objects and are not used to describe a particular order. Furthermore, the terms "including/comprising" and "having" and any variations thereof are intended to cover non-exclusive inclusion.

In embodiments of the present disclosure, the reference to "indication" may be a direct indication, an indirect indication, or an association. For example, A indicates B, which can mean that A directly indicates B, for example, B can be obtained through A. It is also indicated that A indirectly indicates B, for example, A indicates C, and B can be obtained by C. It is also indicated that there is an association between A and B.

In embodiments of the present disclosure, "B corresponding to A" means that B is associated with A from which B may be determined. It shall also be understood, however, that determining B according to A does not mean determining B only according to A, and B may also be determined according to A and/or other information.

In embodiments of the present disclosure, the term "corresponding" may mean a direct or indirect correspondence relationship between the two, an association relationship between the two, indicating and being indicated between the two, configuring and being configured between the two, and the like.

In embodiments of the present disclosure, "predefining/predefined" or "pre-configured" may be achieved by pre-storing corresponding codes, tables, or other means that may be used to indicate relevant information in devices (e.g., including UEs and network devices), and the specific implementation of which is not limited herein. For example, "predefining/predefined" or "pre-configured" can refer to what is defined in the protocol.

In embodiments of the present disclosure, the "protocol" may refer to a standard protocol in the communication field, for example, may include an LTE protocol, an NR protocol, and related protocols applied in future communication systems, which are not limited in the present disclosure.

The term "and/or" in the embodiment of the present disclosure is merely an association relationship that describes an associated object, indicating that there may be three relationships, for example, A and/or B, which may indicate that there are three situations: A alone, A and B simultaneously, and B alone. In addition, the character "/" herein generally indicates that the related objects are a kind of "or" relationship.

In various embodiments of the present disclosure, the size of the sequence number of the above-mentioned processes does not mean the order of execution, and the execution order of each process should be determined by its function and inherent logic, and should not constitute any limitation on the implementation process of the embodiment of the present disclosure.

In several embodiments provided herein it should be understood that the disclosed systems, devices, and methods may be implemented in other ways. For example, the above-described embodiments of the device is only schematic, for example, the division of the unit is only a logical function division, and in practice, there may be another division mode, for example, multiple units or components may be combined or integrated into another system, or some features may be ignored or not performed. On the other hand, the coupling or direct coupling or communication connection between each other shown or discussed may be indirect coupling or communication connection through some interfaces, devices, or units, and may be electrical, mechanical or other form.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

In the above-described embodiments, it may be implemented in whole or in part by software, hardware, firmware, or any combination thereof. When implemented in software, it can be implemented in whole or in part in the form of a computer program product. The computer program product includes one or more computer instructions. When the computer program instructions are loaded and executed on a computer, the processes or functions described in accordance with embodiments of the present disclosure are generated in whole or in part. The computer may be a general-purpose computer, a special purpose computer, a computer network, or other programmable device. The computer instructions may be stored in the computer-readable storage medium, or transmitted from one computer-readable storage medium to another computer-readable storage medium, for example, the computer instructions may be transmitted from one Web site, computer, server, or data center to another Web site, computer, server, or data center via wired (e.g., coaxial cable, optical fiber, digital subscriber line (DSL)) or wireless (e.g., infrared, wireless, microwave, etc.). The computer-readable storage medium may be any usable medium that a computer can read or a data storage device such as a server, data center, or the like that includes one or more usable media integration. The usable media may be magnetic media (e.g., floppy disk, hard disk, magnetic tape), optical media (e.g., digital video disc (DVD)), or semiconductor media (e.g., solid state disk (SSD)), etc.

The above-mentioned is only the specific implementation of the present disclosure, but the scope of protection of the present disclosure is not limited thereto. Any technical person familiar with the technical field who can easily think of changes or substitutions within the technical scope disclosed in the present disclosure should be covered within the scope of protection of the present disclosure. Therefore, the scope of protection of this application shall be subject to the scope of protection of the claims.

What is claimed is:

1. A method, comprising:
transmitting, by a first node, X1 first random access (RA) preambles, X1 being a positive integer greater than 1;
monitoring a control signaling for a first random access response (RAR) during a first time-window, wherein the first RAR corresponds to the X1 first RA preambles;
updating a current value of a first counter to obtain an updated value of the first counter when reception of the first RAR is not successful while the first time-window expires; and
performing at least one of the following:
transmitting X2 second RA preambles in response to the updated value of the first counter being less than a first threshold, wherein X2 is a positive integer greater than or equal to X1; or
dropping transmission of X2 second RA preambles in response to the updated value of the first counter being greater than the first threshold.

2. The method of claim 1, comprising:
setting an initial value of the first counter to X0, wherein X0 is a positive integer greater than 1, and the initial value of the first counter is less than or equal to the current value of the first counter; and
selecting X0 physical random access channel (PRACH) occasions (ROs);
wherein the X0 ROs are configured for a first RA procedure.

3. The method of claim 1, comprising:
indicating a RA problem to upper layers in response to the updated value of the first counter being greater than the first threshold.

4. The method of claim 1, comprising:
receiving first information, wherein the first information indicates a plurality of candidate values, the plurality of candidate values including X1 and X2.

5. A method, comprising:
performing, by a second node, reception of X1 first random access (RA) preambles, X1 being a positive integer greater than 1; and
determining whether to transmit a control signaling for a first random access response (RAR) according to a result of the reception of the X1 first RA preambles during a first time-window, wherein the first RAR corresponds to the X1 first RA preambles; and
when the control signaling for the first RAR is not successfully transmitted while the first time-window expires, performing at least one of the following:
performing reception of X2 second RA preambles in response to an updated value of a first counter being less than a first threshold, wherein X2 is a positive integer greater than or equal to X1; or
dropping reception of X2 second RA preambles in response to the updated value of the first counter being greater than the first threshold.

6. The method of claim 5, comprising:
stopping the first time-window, in response to the control signaling for the first RAR being transmitted successfully during the first time-window.

7. The method of claim 5, comprising:
transmitting first information, the first information being configured to determine a plurality of candidate values, the plurality of candidate values including X1 and X2.

8. A first node, comprising:
at least one processor; and
one or more memories coupled to the at least one processor and storing programming instructions for execution by the at least one processor to cause the first node to perform operations comprising:
transmitting X1 first random access (RA) preambles, X1 being a positive integer greater than 1;
monitoring a control signaling for a first random access response (RAR) during a first time-window, wherein the first RAR corresponds to the X1 first RA preambles;
updating a current value of a first counter to obtain an updated value of the first counter when reception of the first RAR is not successful while the first time-window expires; and
performing at least one of the following:
transmitting X2 second RA preambles in response to the updated value of the first counter being less than a first threshold, wherein X2 is a positive integer greater than or equal to X1; or
dropping transmission of X2 second RA preambles in response to the updated value of the first counter being greater than the first threshold.

9. The first node according to claim 8, the operations comprising:
setting an initial value of the first counter to X0, wherein X0 is a positive integer greater than 1, and the initial value of the first counter is less than or equal to the current value of the first counter; and
selecting X0 physical random access channel (PRACH) occasions (ROs);
wherein the X0 ROs are configured for a first RA procedure.

10. The first node according to claim 8, the operations comprising:

indicating a RA problem to upper layers in response to the updated value of the first counter being greater than the first threshold.

11. The first node according to claim 8, the operations comprising:

receiving first information, wherein the first information indicates a plurality of candidate values, the plurality of candidate values including X1 and X2.

* * * * *